United States Patent [19]

Schlotterer et al.

[11] 3,827,029

[45] July 30, 1974

[54] MEMORY AND PROGRAM PROTECTION SYSTEM FOR A DIGITAL COMPUTER SYSTEM

[75] Inventors: John C. Schlotterer, Casselberry, Fla.; Lionel S. Smith, Jr., San Jose, Calif.

[73] Assignee: Westinghouse Electric Corporation, Pittsburgh, Pa.

[22] Filed: Sept. 25, 1972

[21] Appl. No.: 292,221

[52] U.S. Cl. .......... 340/172.5
[51] Int. Cl. .......... G06f 11/00
[58] Field of Search .......... 340/172.5

[56] References Cited

UNITED STATES PATENTS

| | | | |
|---|---|---|---|
| 3,340,539 | 9/1967 | Sims, Jr. | 340/172.5 |
| 3,573,855 | 4/1971 | Cragon et al. | 340/172.5 |
| 3,585,606 | 6/1971 | Evans et al. | 340/172.5 |
| 3,599,159 | 12/1971 | Creech et al. | 340/172.5 |
| 3,671,940 | 6/1972 | Kronies et al. | 340/172.5 |

*Primary Examiner*—Raulfe B. Zache
*Assistant Examiner*—Michael Sachs
*Attorney, Agent, or Firm*—R. G. Brodahl

[57] ABSTRACT

A small size digital computer system is designed so that a hardware memory violation protect subsystem may be added to the computer system as a hardware option. The memory protect subsystem includes hardware which may operate in parallel with the digital computer system memory subsystem and which monitors each attempt to alter data within the memory subsystem. Any attempt to alter data within a protected region may be defeated. Following such an attempt, program execution is interrupted and program control is transferred to the computer system executive software. The computer system is also designed so that it may either modify or prevent the execution of certain instructions at times when the memory protect subsystem is in operation so as to defeat all attempts on the part of any software entity to destroy the integrity of the operating system.

10 Claims, 9 Drawing Figures

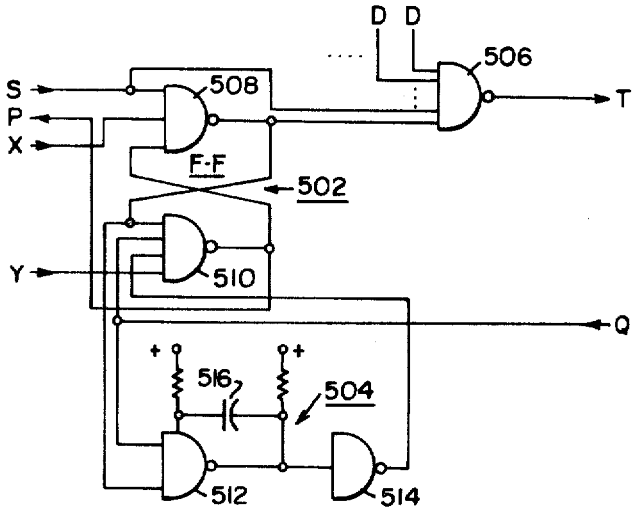
FIG. 5
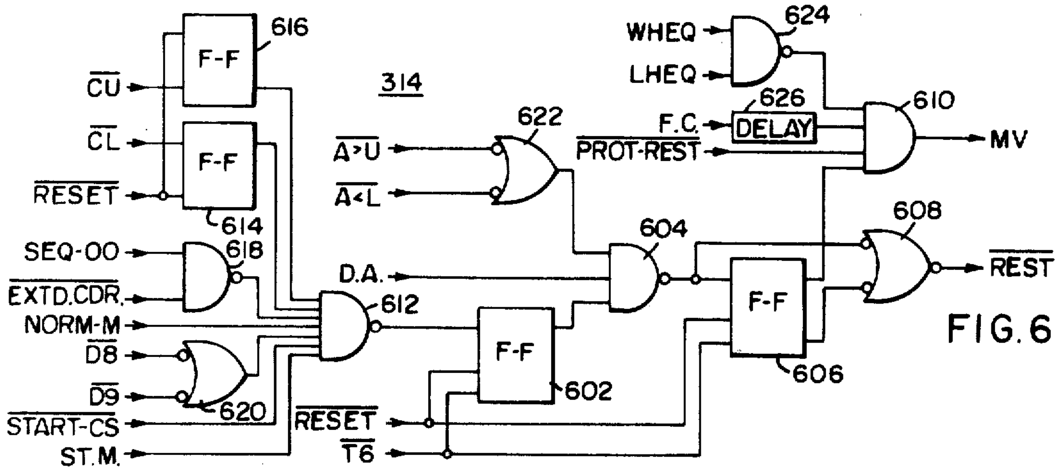
FIG. 6
IN GENERAL
BIT POSITION
| 15 | 14 | 13 | 12 | 11 | 10 | 9 | 8 | 7 | 6 | 5 | 4 | 3 | 2 | 1 | 0 |
|---|---|---|---|---|---|---|---|---|---|---|---|---|---|---|---|
| FUNCTION | | | | | MODE | | | DISPLACEMENT | | | | | | | |
CDR INSTRUCTION
| | | | | | | | | | | | | | | | |
|---|---|---|---|---|---|---|---|---|---|---|---|---|---|---|---|
| 0 | 0 | 1 | 1 | 0 | 0 | 0 | 1 | 0 | 0 | 0 | 0 | 1 | 1 | 1 | 1 |
FIG. 7

MEMORY AND PROGRAM PROTECTION SYSTEM FOR A DIGITAL COMPUTER SYSTEM

BACKGROUND OF THE INVENTION

1. Field of the Invention

The present invention relates to protection systems which preserve the integrity of the controlling or executive programs within a digital computer system and which defeat any efforts on the part of other programs running within the system either to bypass or to damage the executive programs. More particularly, the present invention relates to such systems designed for use in low cost minicomputers.

2. Brief Description of the Prior Art

The need for a memory and program protect feature in a digital computer system arose at an early date when such computers were first used for the batch processing of programs coming from a wide variety of sources. It was found that occasionally a program was received which contained instruction sequences that could modify or even destroy the core- or disk-resident executive programs which control all bookkeeping, scheduling, and data input and output operations within a computer system. Sometimes occurrences of this nature were accidental, as when a program accidentally requests that data be altered in a location outside the bounds of the program itself. In other cases, the modification of an operating executive was intentionally brought about, as when a program was intentionally constructed to sabotage a computer operation. In cases where only a slight modification of the executive programming is accidentally made, the modification often might not make itself apparent for days or for months, and in the meantime erroneous operations could often be carried out by the computer system. In cases where extensive damage was done, typically a computer installation would have to be closed down while all of the system executive routines were reloaded into the computer system.

In large size digital computer systems, protection features are normally built right into the system hardware. Any improper action on the part of a program results immediately in a transfer to an appropriate executive diagnostic routine.

The problem with developing a suitable memory protect feature for small sized minicomputer is a difficult one. Minicomputers are normally designed to sell at a very low cost and are therefore normally constructed with a minimum of excess hardware that does not have general application. As an example, most basic minicomputers come equipped to perform only the most simple of arithmetic operations using hardware, and software is utilized to perform more complex arithmetic operations at a low speed. If higher execution speeds are required in a particular application, then typically an extra-cost, high speed hardware arithmetic unit is purchased along with the minicomputer as an accessory. Since not every computer installation requires a security system to protect the integrity of the system software, such a system is preferably not included as a normal feature of the minicomputer but is made available as an "ADD ON" hardware feature which may be purchased separately from the computer itself.

A number of different approaches have been taken to providing memory and program protection features in minicomputers. One very simple approach provides a manually actuatable switch for each section of the system core memory which it may be desirable to protect. The system then may prevent the execution of certain instructions upon data stored in any protected section of the core memory and may also prevent any transfers of program control from unprotected to protected areas of the core memory. Systems of this type lack flexibility, since they typically protect blocks of memory locations the sizes of which may not be readily varied. Systems of this general type sometimes base the operation of the protection system upon which areas of the core memory are controlling program execution. Hence, all commands issued by programs residing in one region of core are executed, while some commands issued by programs residing in another region of core are not executed. This approach limits system flexibility by requiring certain portions of the system core memory to be always dedicated either to unprotected or to protected programs.

In order to insure protection of stored data in any such system, it is typically necessary for the system processor to include within its normal cyclic memory steps an additional step which checks to see if each operation is a proper one which does not violate the protection limits of the system. Additional steps of this type slow down the system and may adversely affect the performance of the computer system in real time, such as in a process control system. Increased costs result, since such a system requires more time to execute any given program than does a similar system not having any protection system.

An additional disadvantage of a conventional system arises when such a system is used in a computer in which some of the system high speed memory addresses correspond to working registers which are used by all programs and in systems which use directly computed memory addressing rather than "page" memory addressing. If the lowest sixteen addresses in the system are working registers, and if the system executive is stored in low core, it is difficult to design a system which permits access to the working registers but still protects the executive. In a computer system having a memory divided into pages, it can be a relatively simple matter to prevent a given program from accessing any particular "page" of the memory by carrying out appropriate checks whenever a program attempts to alter the "page" to which the memory is adjusted. In a system which allows addresses to be freely computed, each individual address has to be checked every time the system memory is interrogated if full protection is to be achieved.

SUMMARY OF THE INVENTION

A primary object of the present invention is to overcome those deficiencies of prior art systems which have just been pointed out. Additional objects of the invention are to provide a computer system integrity protection system which does not slow down computer operations, which permits unprotected program execution throughout the system core memory whenever such execution is desirable, and which does not add substantially to the basic cost of a minicomputer purchased without the integrity protection system hardware.

Briefly described, the present invention contemplates providing a separate subsystem of the computer system which may be added to the computer system as an extra cost option whenever a full integrity protection system is desired. This extra subsystem contains registers which may be loaded, using the normal data input and output channels of the computer system, with data defining an area of the system memory that is to be protected. During all subsequent memory data access operations, this subsystem monitors the command and the address data which are transferred from the computer processing unit to the computer memory subsystem. If the subsystem detects an attempt to alter data stored within the protected region, the subsystem intervenes and prevents the alteration of the protected data. The subsystem also may initiate a processor interrupt within the computer system and thus put into operation a hardware mechanism for interrupting program execution and for returning program control to an appropriate executive routine.

In the preferred embodiment of the invention, a series of instructions are prevented from having their normal effect whenever the protect subsystem is in operation. In particular, any attempt by a program to transfer data into or out of the computer system, to halt the computer system, or to defeat the protected mode of operation is not carried out and normally produces a processor interrupt.

During a processor interrupt or any other system interrupt, the protect subsystem is disabled and program control may commence in any portion of core. Means are also provided within the computer system whereby the protect subsystem may be turned off completely during an interrupt so that unlimited program execution may take place outside of the processor interrupt mode without the protect feature limiting what a program may do.

The area of the system memory which is protected may be freely adjusted by appropriate input/output instructions generated by the computer system. The area boundaries may not be changed when the protect subsystem is operating because at such times input/output instructions are considered illegal. The area boundaries may be readily changed during a processor interrupt or at any other time when the protect mode of operation is not effective.

In order to understand fully how the memory protect feature of the invention may be implemented without slowing down the computer's central processing unit, it is desirable to first understand how memory data transfers are ordinarily carried out. In a typical computer system, both data reading and data writing operations are initiated by a "start memory" command that is generated by a central processing unit. The "start memory" command causes a memory subsystem to retrieve memory data from a specific location whose address is also generated by the central processing unit. In most magnetic memory subsystems, this reading process is destructive and leaves no data stored in the specified location. When the data has been retrieved, the memory subsystem generates a "data available" signal and returns that signal to the central processing unit. The central processing unit then returns a "finish cycle" signal to the memory subsystem. The "finish cycle" signal may or may not be accompanied by a "restore" signal. If the "finish cycle" signal is accompanied by the "restore" signal, then the memory subsystem transfers back into storage the data which was just retrieved. If new data is to be written into the memory, then the "restore" signal does not accompany the "finish cycle" signal. The absence of the "restore" signal causes the memory subsystem to accept a new data set from the central processor and to store the new data set in the specified location.

The memory protect subsystem includes means which sense the addressing signals which flow from the central processing unit to the memory subsystem each time that a "start memory" signal is sent from the processor to the memory subsystem. The addressing signals are compared to upper and lower limit address signals which are generated by the subsystem. If the address indicated by the addressing signals lies above the upper limit or below the lower limit address signal address, then the subsystem generates its own "restore" signal and forces the memory subsystem to restore any data which it retrieves from the specified location rather than to accept new data from the central processing unit. The memory protect subsystem also monitors certain other signals within the central processing unit and determines whether or not an attempt was actually made to alter memory data in a protected region. If so, then the subsystem initiates a processor interrupt which terminates program execution and returns program control to the system executive. The subsystem does not interfere in any way with normal computer operations and does not increase the normal cycle time of the computer system. All memory protecting actions are taken through simple intervention without the knowledge of the central processing unit.

The only portions of the present invention which are incorporated into a basic minicomputer design are those portions which modify or prevent the normal operation of certain instructions when a particular processor flag is set. These portions may be incorporated into a typical minicomputer system with relatively little increase in the system cost. The basic minicomputer system may be then adapted to give memory and program protection in accordance with the invention by the simple insertion into the system of an additional card containing the protection subsystem hardware. Additional details relating to that computer system may be found in publication No. RF 2500–01, copies of which may be obtained from the same source.

Further objects and advantages of the invention are apparent in the detailed description which follows. The points of novelty which characterize the invention are pointed out with particularity in the claims annexed to and forming a part of the specification.

BRIEF DESCRIPTION OF THE DRAWINGS

FIG. 4 is a partly block and partly logic diagram of the register control logic which appears as a block element in FIG. 3.

FIG. 5 is a partly schematic and partly logical diagram of a typical timing stage within the timing generator shown in FIG. 4A.

FIG. 6 is a logic diagram of the memory violation detection logic which appears as a block element of FIG. 3.

FIG. 7 illustrates a format of the instruction or command words which are used within the computer system shown in FIG. 1, and illustrates in particular the structure of a CDR instruction which is used in adjusting computer system flags that control the operation of the memory and program protect systems.

DETAILED DESCRIPTION OF THE PREFERRED EMBODIMENT

In its preferred mode, the present invention is designed for use with the Westinghouse 2,500 computer system. To the extent that the details of that system are relevant to the present invention, they are disclosed in the discussion which follows. A more detailed description of that computer system may be found in publication number 25REF–001 entitled "2500 Computer Reference Manual" which may be obtained from the Computer Department, Westinghouse Computer and Instrumentation Division, 1200 West Colonial Drive, Orlando, Florida 32804.

Figure 1:
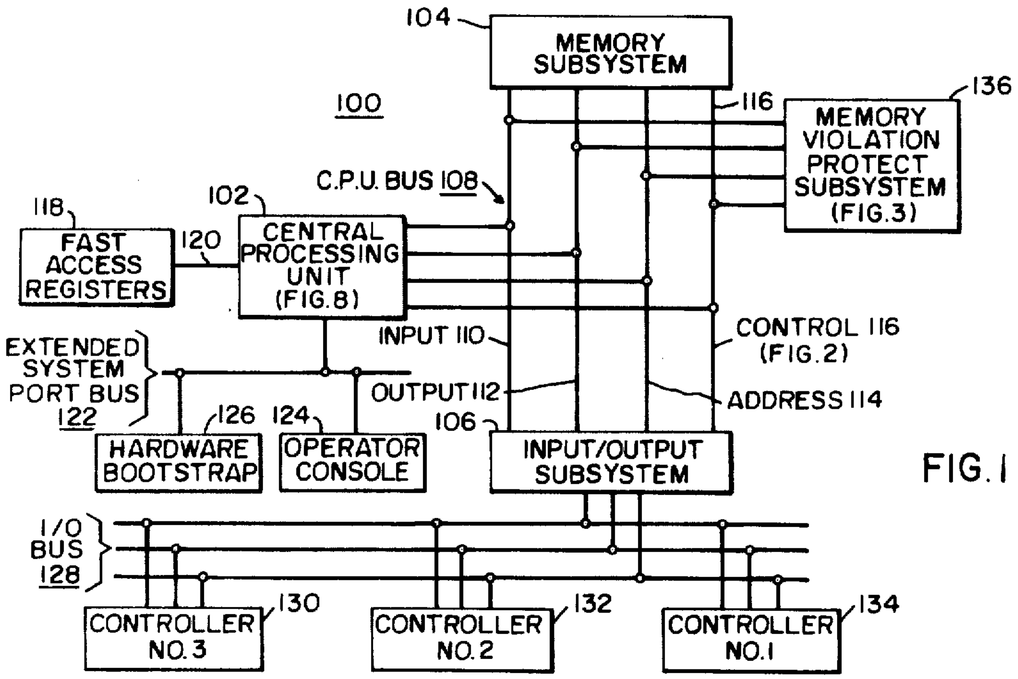
FIG. 1 is an overview block diagram of a computer system that is designed to function in accordance with the invention.

With reference to FIG. 1, a typical 2500 computer system is shown in block diagram form and is indicated generally by the reference numeral 100. The computer system 100 includes three major elements: a central processing unit 102, a memory subsystem 104, and an input/output subsystem 106. These three major subsystems are interconnected to each other by a central processing unit data bus 108 comprising an input data bus 110, an output data bus 112, and address data bus 114, and a control bus 116. Data which is to be transferred from either of the subsystems 104 or 106 to the central processing unit 102 is applied to the input data bus 110. Data which is to be transferred from the central processing unit 102 to one of the subsystems is applied to the output data bus 112. The subsystems 104 and 106 additionally may use the input and output data busses for direct communication. In most cases, any transfer of data is accompanied by an address which is presented to the address bus 114 and which indicates where that data is to be transferred. All data transfers are coordinated through the use of control signals within the control bus 116.

The central processing unit 102 is connected by a bus 120 to a fast access register array 118. The system accumulator, extended accumulator, address base registers, program counter, etc., and working registers are all stored within the fast access registers 118. There are 32 fast access registers 118 and they are respectively assigned the addresses 0 to 31 within the computer system. Locations within the memory subsystem 104 commence with the address 33 and continue upwards through the addressable memory of the computer system.

An extended system port bus 122 is provided to connect the central processing unit 102 to an operator console 124 and also to a hardware bootstrap circuit 126. The hardware bootstrap 126 is an optional feature of the system, and the console 124 also may be dispensed with in certain system applications.

The input/output subsystem 106 is connected by an input/output bus 128 to a plurality of controllers 130, 132, and 134 which interface the system with any desired number of external devices. For example, a first controller may interface with a card reading device, a second controller may interface with a line printer, and a third controller may interface with a mass data storage device of some form. In a process control environment, the controllers may interface directly with both analog and digital signals and controllable devices within the process environment.

In accordance with one aspect of the invention, the system 100 is designed to interface with a memory violation protect subsystem 136. The subsystem 136 includes connections to all of the busses which comprise the central processing unit bus 108 and is therefore able to monitor all requests by the central processing unit for data to be retrieved from or stored within the memory subsystem 104. In the case of an attempt by the central processing unit 102 to alter data within a protected portion of the memory subsystem 104, the memory violation protect subsystem 136 intervenes and forces the restoration of any data which is retrieved from the memory system 104 and thus prevents the alteration of any such data. The particular area of the memory subsystem 104 which is protected is determined by an upper and a lower address register within the protect subsystem 136. The contents of these registers may be altered through the use of normal input/output commands generated by the central processing unit 102. These commands are intercepted by the subsystem 136 prior to the entry of these commands into the input/output subsystem 106. In addition, the subsystem 136 may contain a register which stores the address of a protected memory location which the central processing unit 102 has improperly attempted to alter so that this address may be printed out along with an appropriate diagnostic message after any such improper attempt occurs.

In order to fully understand how the memory violation protect subsystem 136 can prevent the central processing unit 102 from altering data within the memory subsystem 104 without slowing down the operation of the central processing unit 102, it is first desirable to have a relatively complete understanding of how data retrieval operations and of how input/output data transfers are normally carried out by the central processing unit 102.

Figure 2:
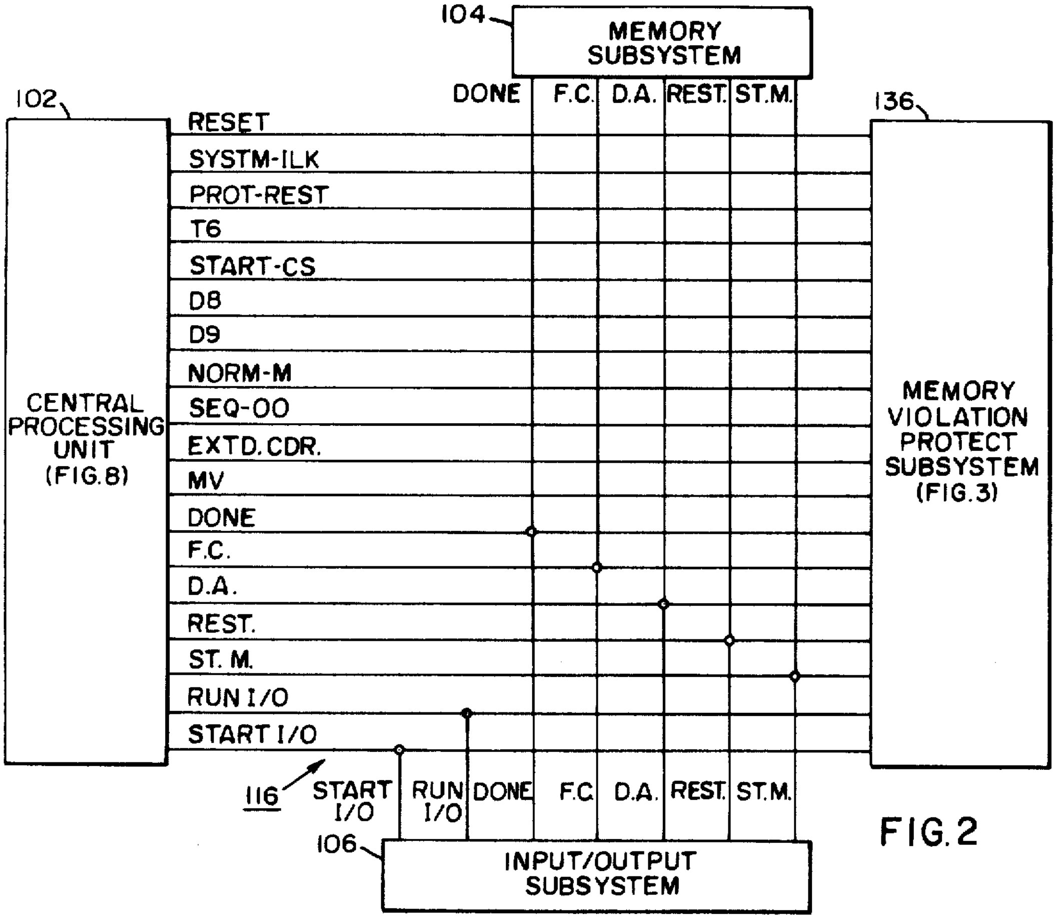
FIG. 2 is a block diagram illustrating the flow of control signals between the various major subsystems of the computer system shown in FIG. 1.

FIG. 2 illustrates the control signals which interconnect the central processing unit 102 with the memory subsystem 104. When the central processing unit 102 desires to retrieve data from a location within the memory subsystem 104, the central processing unit 102 places the address of the desired data upon the address bus 114 (FIG. 1) and generates a ST.M. (start memory) signal. The central processing unit 102 then halts. In response to the ST.M. (start memory) signal, the memory subsystem 104 retrieves the data stored in the memory location having the indicated address and presents this data to the central processing unit 102 over the input data bus 110 (FIG. 1). This operation of retrieving the data from the address location necessarily destroys the data stored in that location because the memory subsystem 104 uses magnetic means for data storage and because the data readout process is destructive. Having completed the data retrieval operation, the memory subsystem 104 generates a D.A. (data available) signal which informs the central processing unit 102 that the requested data retrieval operation has been completed.

The central processing unit 102 now has two options. If the data previously stored in the memory location is to be preserved in that location, the central processing unit 102 generates an F.C. (finish cycle) signal and simultaneously generates an REST. (restore) signal. Both of these signals are supplied to the memory subsystem 104 as is indicated in FIG. 2. The REST. (restore) signal tells the memory subsystem 104 that the data previously retrieved from the memory location is now to be returned or "restored" to that same location. The F.C. (finish cycle) signal causes the memory subsystem to carry out this restoring operation. At its completion, the memory subsystem generates a DONE signal to indicate that the restoring operation has been completed. The central processing unit 102 responds to the DONE signal by proceeding on to its next task.

If new data is to be written in to the addressed location of the memory subsystem 104, then the central processing unit 102 responds in a different manner to the D.A. (data available) signal generated by the memory subsystem. The central processing unit 102 first presents the new data which is to be stored in the previously addressed memory location to the output data bus 112 (FIG. 1). The central processing unit 102 then generates the F.C. (finish cycle) signal but does not generate the REST. (restore) signal. The memory subsystem 104 responds to the F.C. (finish cycle) signal and to the absence of the REST. (restore) signal by accepting the data which is presented over the output data bus 112 and by storing this data in the location whose address is still present on the address bus 114. In this manner, the new data is written into the designated location. The memory subsystem then signals the completion of the task by generating the DONE signal.

Data communication between the central processing unit 102 and the input/output subsystem 106 are carried out in a similar manner. Any data transfer is initiated by a START I/O (start input/output) signal that is generated by the central processing unit 102. The system 100 includes provision for both direct input and output operations and also for buffered input and output operations, but only direct input and output operations are relevant to the present discussion. To distinguish a direct operation from a buffered operation, the central processing unit 102 generates a RUN I/O (run input/output) signal only during direct input and output operations. Buffered input and output operations are distinguished by the absence of this same signal.

Assuming that a direct input or output operation is to be carried out, the central processing unit 102 initially generates both of the signals RUN I/O and START I/O. Simultaneously, the central processing unit 102 presents to the address bus 114 (FIG. 1) the address of a particular external device to which data is to be transferred or from which data is to be accepted. In a typical case, the input/output subsystem 106 accepts these commands and then carries out some form of one- or two-way communication with one or more of the controllers 130, 132 and 134 which are shown in FIG. 1. The subsystem 106 then generates the D.A. (data available) signal which signal is retuned to the central processing unit 102. Simultaneously, any data which is to be fed into the central processing unit 102 is presented by the input/output subsystem 106 to the input data bus 110. If data is to be fed from the central processing unit 102 to the input/output subsystem 106, then the central processing unit 102 generates the F.C. (finish cycle) signal and simultaneously presents the data on the output data bus 112 (FIG. 1). The input/output subsystem 106 then accepts the data, transfers the data to one of the controllers 130, 132, or 134, and returns the DONE signal to the central processing unit 102 to indicate completion of the task.

The normal procedures for transferring data between the central processing unit 102 and the two subsystems 104 and 106 have just been described. In FIG. 2, it is evident that all of the signals which are used to control the transfer of data are also fed into the memory violation protect subsystem 136. The subsystem 136 thus may function in the same manner as the input/output subsystem 106 in receiving data from the central processing unit 102 and in returning data to the central processing unit 102. In particular, the central processing unit 102 has occasion to transmit to the memory violation protect subsystem 136 numbers defining those regions within the memory subsystem which are to be protected and has occasion to receive from the memory violation protect subsystem 136 the address of a memory location that was involved in an improper operation.

The memory violation protect subsystem 136 is also in an excellent position to monitor all transfers of data between the central processing unit 102 and the memory subsystem 104. Whenever the central processing unit has occasion to interrogate a protected region within the memory subsystem, the memory violation protect subsystem 136 may prevent alteration of the protected data simply generating the REST. (restore) signal at an appropriate time so as to always force the restoral of data to such regions.

Figure 3:
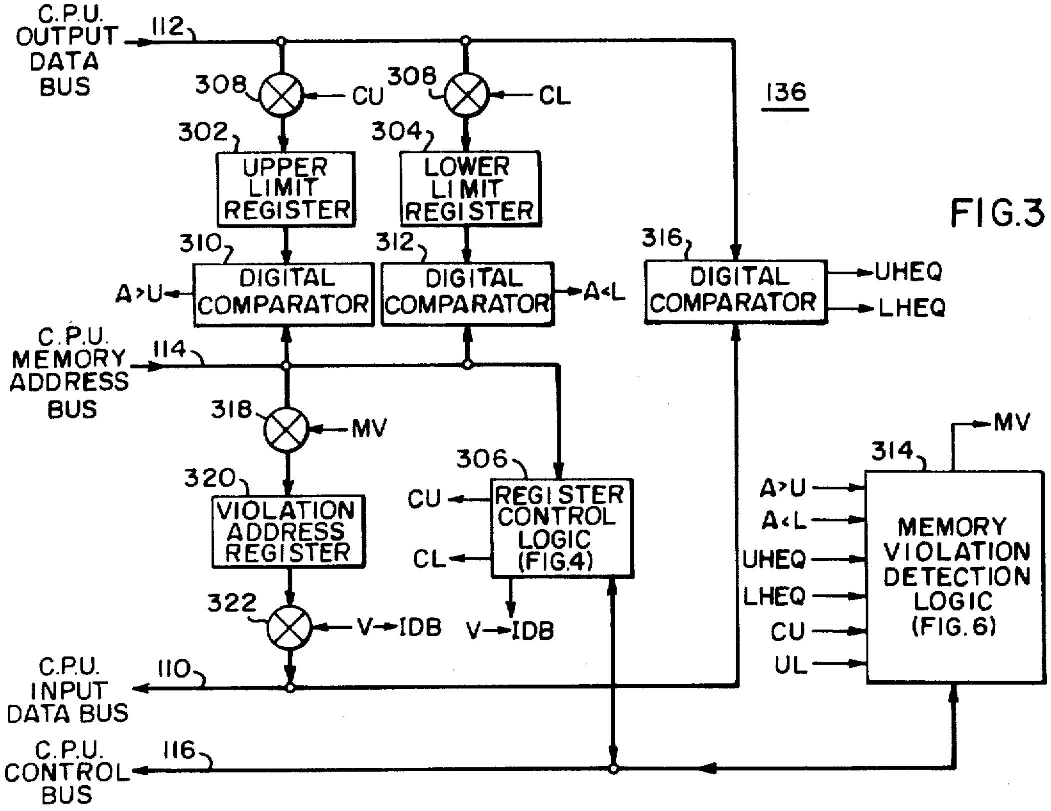
FIG. 3 is a block diagram of the memory violation protect subsystem which appears as a block element of FIG. 1.

A block diagram of the memory violation protect subsystem 136 is presented in FIG. 3. The subsystem 136 includes an upper limit register 302 and a lower limit register 304 which may be used to delimit a region within the system memory which region is to be unprotected and freely accessed by any program. This unprotected region of the memory is bounded by a first memory location whose address is stored in the upper limit register 302 and by a second, lower memory location whose address is stored in the lower limit register 304. A register control logic 306 controls the actuation of register loading gates 308 and allows any desired address values to be stored within the registers 302 and 304 at the request of the central processing unit 102, as is explained more fully below.

The memory violation protect subsystem 136 operates by using digital comparators 310 and 312 to compare each address which is presented on the memory address bus 114 of the central processing unit 102 to the addresses stored within the registers 302 and 304. If the address is above that stored in the upper limit register 302, the digital comparator 310 generates an $A < U$ (address greater than upper limit) signal. If the address is lower than the address stored in the register 304, a digital comparator 312 similarly generates an $A < L$ (address lower than lower limit) signal. These two signals are then fed into a memory violation detection logic 314.

The logic 314 typically responds to either of these two signals by generating the REST. (restore) signal and supplies the signal to the control bus 116 so as to insure that no memory data within a protected region is altered or destroyed. The logic 314 also examines the control signals present in the control bus 116 to determine whether an attempt is actually being made to write new data into an improper memory location. If such an attempt occurs, the logic 314 checks with the digital comparator 316 to see if the data which is to be written into the memory, as indicated by the data presented to the input data bus 110, is identical to the data just received from the memory and still present on the output data bus 112. If so, then no violation has occurred since the same data which was removed from the memory is now being returned.

If the logic 314 determines that the data which is presented to the memory over the output data bus 112 does not agree with the data just retrieved from the memory, then an improper operation has occurred. The logic 314 then generates an MV (memory violation) signal which ultimately causes a processor interrupt and returns program control to an executive routine within the computer system. The MV signal also causes the address currently present on the address bus 114 to pass through a gate 318 and into a violation address register 320. In this manner, the address of the protected memory location which the central processing unit attempted to alter is stored within a register 320 and is available to aid in determining what caused the improper action. At a later time, the central processing unit may call upon the register control logic 306 to initiate a transfer of data out of the register 320, through the gate 322, and back to the central processing unit 102 over the input data bus, as is explained more fully below.

Figure 4A:
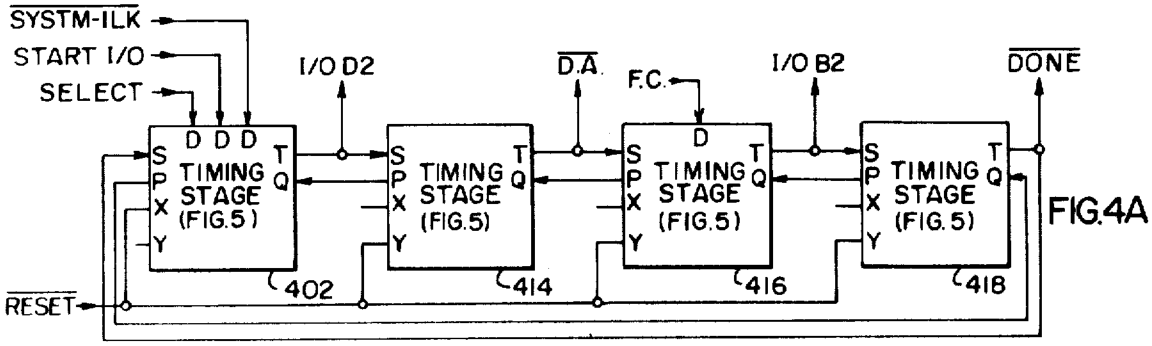
FIG. 4A illustrates a timing generator for the register control logic.
Figure 4B:
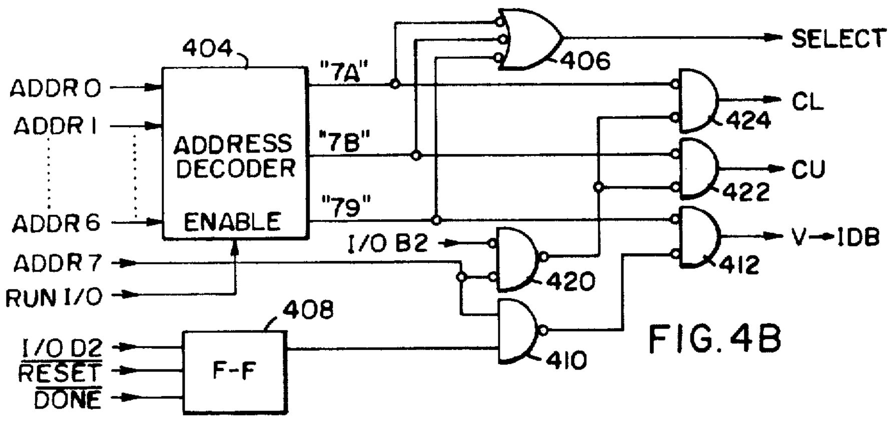
FIG. 4B illustrates the address decoding and control portions of the register control logic.

FIG. 4 is a partly block and partly logical diagram of the register control logic 306 which controls the loading of data into the registers 302 and 304, and which controls the retrieval of data from the register 320, all of which registers are shown in FIG. 3. The register control logic 306 is designed to be interrogated by the central processing unit 102 in the same manner that the input/output subsystem 106 is interrogated and through the use of the same control signals. The register control logic 306 is an operative subsystem of the computer system, and it therefore contains a source of timing signals to control its operation. The timing signal portion of the control logic 306 appears in FIG. 4A, and the actual signal generating portions of the control logic appear in FIG. 4B. What follows is a brief, overview description of the control logic 306 with reference primarily to FIG. 3. A more detailed description of the control logic 306 with reference to FIGS. 4A and 4B is presented at a later point.

When the central processing unit 102 (FIG. 1) wishes to transfer data into either the upper limit register 302 or the lower limit register 304, the central processing unit 102 presents the data which is to be transferred to the output data bus 112 (FIG. 3) and simultaneously applies the address of either the register 302 or of the register 304 to the address bus 114 (FIG. 3). The central processing unit 102 then generates the START I/O and the RUN I/O signals to initiate operation of the register control logic 306 (FIG. 3). When the register control logic 306 responds with the D.A. (data available) control signal, the central processing unit 102 generates the F.C. (finish cycle) signal. In response to the F.C. signal, the register control logic 306 generates either a CU or a CL signal which enables one of the gates 308 (FIG. 3) to transfer the data presented by the output data bus 112 into either the upper limit register 302 or the lower limit register 304, depending upon which register's address has been applied to the address bus 114.

When the central processing unit 102 wishes to recover data from the register 320, the central processing unit presents the address of the register 320 to the address bus 114 (FIG. 3) and then simultaneously generates the START I/O and the RUN I/O signals. In response to these control signals, and in response to the proper address code being presented to the address bus 114, the register control logic 306 generates a *V* → *IDB* signal which enables the gate 327 (FIG. 3) to present the contents of the violation address register 320 to the central processing unit input data bus 110. The register control logic 306 then generates the D.A. (data available) signal to tell the central processing unit 102 that the requested data in the register 320 is now available on the input data bus 110. The central processing unit 102 accepts this data and then generates the F.C. (finish cycle) signal which causes the register control logic 306 to reset itself. When the logic 306 has finished all operations, it generates a DONE signal.

Referring more particularly to FIGS. 4A and 4B, whenever the central processing unit 102 generates the START I/O and the RUN I/O signals, the START I/O signal is fed into a first timing stage 402 shown in FIG. 4A. The RUN I/O signal is fed into an enable input of an address decoder 404 shown in FIG. 4B. In response to the RUN I/O enabling signal, the address decoder 404 decodes the address code presented by the seven least significant binary digit signal lines ADDRO, ADDR1, . . . , ADDR6 (see FIG. 4B) of the address bus 114.

In the system 100, a seven bit code is used to address individual controllers connected to the normal input/output sybsystem 106 of the computer system 100. An eighth address code bit indicates whether the data transfer is towards or away from the central processing unit 102 accumulator. In the preferred embodiment of the invention, the upper limit register 302 (FIG. 3) is arbitrarily assigned the seven-bit input/output hexadecimal address code $7B_{16}$ and the lower limit register 304 is arbitrarily assigned the seven-bit input/output hexadecimal address code $7A_{16}$. The violation address register 320 is assigned the seven-bit input/output hexadecimal address code $79_{16}$. Since data is being transferred into the registers 302 and 304, an eighth "0" data bit is added to the address code for these registers. Since data is being retrieved from the register 320, an eighth "1" data bit is added to the address code for the register 320. This eighth bit appears upon a line ADDR7 within the address bus 114 (the line ADDR7 appears in FIG. 4B).

With reference to FIG. 4B, the address decoder 404 tests the least significant seven bits ADDR0, ADDR1, . . . , ADDR6 of the address code which is presented by the address bus 114 to determine whether the seven-bit address presented by the address bus is that of one of the three registers within the memory violation protect subsystem. If the binary number presented by these seven address lines corresponds to one of the hexadecimal numbers $7A_{16}$, $7B_{16}$, or $79_{16}$, then the address decoder 404 generates an approximately labeled output signal as is illustrated in FIG. 4B using conventional address decoding logic. The RUN I/O enabling signal prevents the address decoder 404 from responding when an address is supplied to a buffered input/output controller.

Whenever the address decoder 404 generates any one of the signals $7A_{16}$, $7B_{16}$, or $79_{16}$, the signal passes through an OR logic gate 406 and becomes a SELECT signal. The SELECT signal, together with the START I/O signal and the absence of a SYSTEM-ILK signal, enables the timing stage 402 to begin generating an I/O D2 output signal. This I/O D2 output signal sets a flip-flop 408 and also partially enables a NAND gate 410.

If the central processing unit 102 is requesting data from the violation address register 320 (FIG. 3), then at this point in time the ADDR7 signal, which is the eighth signal line in the address line 114, is at a high or "1" logic level and fully enables the NAND gate 410 to generate a low level output signal. Simultaneously, the central processing unit presents the proper hexadecimal address code $79_{16}$ to the address decoder 404 so as to cause the "79" signal to appear at the output of the decoder 404. The "79" signal and the low level output from the gate 410 combine to fully enable a NAND gate 412 to generate the $V \rightarrow IDB$ signal which initiates the transfer of data from the violation address register 320 (FIG. 3), through the gate 322, and back to the central processing unit 102 over the input data bus 110.

With reference to FIG. 4A, a second timing stage 414 now transfers a signal P back to the first timing stage 402 input Q which cancels the I/O D2 signal, and then the second timing stage 414 generates the D.A. (data available) control signal (See FIG. 2) which tells the central processing unit 102 that the requested data is available on the input data lines 110. The central processing unit 102 then accepts the data nad generates the F.C. (finish cycle) signal. In response to the F.C. signal, a third timing stage 416 (FIG. 4A) transfers a P signal back to the second timing stage 414 input Q and causes the second timing stage 414 to terminate the D.A. signal. The third timing stage 416 then generates an I/O B2 signal which, for the moment, serves no useful purpose. After a very brief time interval, a fourth timing stage 418 generates a P signal which causes the third timing stage 416 to terminate the I/O B2 signal, and the fourth timing stage 418 then generates a short DONE timing pulse to signal completion of the register control logic 306 timing sequence, to reset the flip-flop 408, and to reset the first timing stage 402 for future operations. The DONE pulse is actually terminated by a returning P signal that is generated by the first timing stage 402.

Assume now that the central processing unit 102 wishes to transfer data into one of the registers 302 or 304 shown in FIG. 3. The central processor begins by generating either the address code "7A" corresponding to the lower limit register 304 or the address code "7B" corresponding to the upper limit register 302 and applies this address code to the seven least significant digit lines ADDR0 to ADDR6 of the address bus 114. Since the data transfer is into the registers and away from the central processing unit, a "0" bit is applied to the eighth digit line ADDR7. The central processing unit 102 then generates both the RUN I/O signal and also the START I/O signal.

In response to the RUN I/O signal, the address decoder 404 recognizes the address and generates either a "7A" or a "7B" output signal. In either case, the signal passes through the OR gate 406 and becomes the SELECT signal. The SELECT signal combines with the START I/O signal generated by the central processing unit to enable the timing stage 402 to generate the output signal I/O D2. The I/O D2 signal sets the flip-flop 408 as it did previously, the output signal of the flip-flop 408 is blocked by the AND gate 410 which is disabled by the absence of a "1" data bit on the address line ADDR7. The second timing stage 414 soon generates the P signal which causes the first timing stage 402 to terminate the I/O D2 signal after a brief interval. The second timing stage then generates the D.A. (data available) signal. The D.A. signal is returned directly to the central processing unit 102 (see FIG. 2). The central processing unit 102 quickly returns an F.C. signal to the third timing stage 416 and causes the third timing stage 416 to return the P signal to the second timing stage 414 so as to terminate the D.A. signal. The third timing stage 415 then commences generating the I/O B2 signal.

This I/O B2 signal combines with the "O" level ADDR7 signal to fully enable an AND gate 420. An output signal then flows from the gate 420 which partially enables a pair of AND gates 422 and 424. Depending upon which of the two signals $7A_{16}$ or $7B_{16}$ the address decoder 404 is generating, one or the other of the AND gates 422 or 424 is fully enabled. If the signal $7B_{16}$ is present, the gate 422 is fully enabled to generate the CU signal which causes one of the gates 308 in FIG. 3 to transfer data presented by the central processing unit into the upper limit register 302. If the signal $7A_{16}$ is present, then the gate 424 is fully enabled to generate the CL signal which causes data from the central processing unit to be loaded into the lower limit register 304.

After a brief interval, the timing stage 418 sends a P signal back to the timing stage 416 which terminates the I/0 B2 signal, and then the timing stage 418 generates the DOnE pulse to indicate the end of the register control logic 306 operation.

The details of a typical control logic 306 timing stage are illustrated in FIG. 5. Each of the timing stages is constructed from a flip-flop 502, a time delay unit 504, and an output gate 506. Each flip-flop 502 is constructed in the conventional manner by cross-connecting one input and the output of each of a pair of NAND gates 508 and 510, as is illustrated in the figure.

The time delay 504 is constructed by connecting two inverting gates in series and by connecting a capacitor 516 to the first of the gates 512 so as to cause signals applied to the first gate 512 input to produce a delayed output at the output of the second gate. The delay time interval is determined by the magnitude of the capacitor 516 and by the size of other circuit components. In FIG. 5, the first gate 512 has its output connected back to an expansion node input by the capacitor 516 which causes the output of the gate 512 to rise and fall more slowly than would otherwise be the case. The ramp signal appearing at the output of the gate 512 is then converted into a relatively clean, square signal by the additional series gate 514. The output gate 514 is a conventional NAND gate. The input gate 512 may be a special time delay gate, or it may be a normal gate whose response may be slowed by the addition of a capacitor.

In operation, a whole series of the typical timing stages are connected in series with one another as is illustrated in FIG. 4A. The T output of a preceding stage is applied to the S input of a given stage. When the T output of the preceding stage goes low, it causes the NAND gate 508 in the given stage to generate a high level output signal, assuming that all other inputs to the NAND gate 508 are at a high level, as is normally the case. The high level output signal from the gate 508 partially enables the output gate 506, also partially enables the second gate 510 in the flip-flop 502, and partially enables the input gate 512 to the time delay network 504.

At this point in time, the Q input to the given timing stage is normally high, and hence the time delay input gate 512 is fully enabled. After a time delay interval which is determined by the characteristics of the time delay 504, the output gate 514 of the time delay 504 goes high and fully enables all inputs to the second gate 510 in the flip-flop 502. The output of the gate 510 then drops to a low level and thus completes the process of changing the stage of the flip-flop 502 to a "set" state. The output of the gate 510 is fed back from the given stage, in the form of a P signal, to the Q terminal of the preceding stage. In the preceding stage, the low level Q signal partly disables the second gate 510 in the flip-flop 502 and thereby clears the flip-flop 502 in the prior stage so that the output of the gate 508 in the preceding stage flip-flop 502 goes low. The output gate 506 in the preceding stage is then disabled, and the S signal generated by the preceding stage goes high.

At this juncture, the output gate 506 in the given stage is partially enabled by a high level S input signal from the preceding stage and also by a high level output signal from the gate 508 in the set flip-flop 502. No further action takes place until the D input signals to the given stage all go high. If the stage has no D input signals, then there is no additional delay at this point.

As soon as all of the D input signals to the given stage go high, or immediately if there are no D signals, the gate 506 is fully enabled to generate a low level output T signal. The T signal is fed into the S input of the stage which follows the given stage and which is referred to hereafter as the following stage.

In the following stage, the S input signal initiates the process of setting the following stage flip-flop 502 as has been described, and also keeps the output gate 506 of the following stage disabled and generating a high level output signal. After a time delay interval which is measured out by the time delay 504 in the following stage, the following signal returns its P signal to the Q input of the given stage. The Q input signal to the given stage clears the flip-flop 502 in the given stage. A low level signal at the output of the gate 508 then disables the output gate 506 and causes the T output of the given stage to go high. The given stage has now completed its functioning.

To briefly summarize, an S input signal to a stage sets the flip-flop 502 within the stage. After a brief time delay, the stage generates a P signal which clears the preceding stage flip-flop and terminates the stage's input signal. If the stage has one or more D input signals, the stage T output signal remains high until all of the D input signals go high. When all of the D input signals go high, or when the stage flip-flop is set if the stage has no D input signals, then the stage generates a low-level T output signal which sets a flip-flop in the following stage. After a brief time delay, the following stage supplies a signal to the stage Q input which clears the flip-flop 502 within the stage. The stage T output signal then terminates by going high. A series of interconnected timing stages function as a chain-connected series of free-running, monostable multivibrators each of which generates a brief output pulse.

The memory violation detection logic is illustrated in a logic diagram in FIG. 6. The flip-flops in FIG. 6 are constructed in essentially the same manner as the flip-flop 502 shown in FIG. 5 but do not include a time delay.

In brief overview, the memory violation detection logic 314 includes a first flip-flop 602 that is set during each memory cycle when the memory protect subsystem is in operation. If memory data is retrieved from a protected region of the memory, a gate 604 generates a signal which passes through an OR gate 608 and becomes the REST. (restore) signal which forces a restoration of the retrieved data into the memory location from which it came. The output of the gate 604 also sets a flip-flop 606, and the flip-flop then continues to generate the REST. signal through the OR gate 608 until the end of the current memory cycle when a T6 timing pulse from the central processing unit clears both of the flip-flops 602 and 606.

Figure 8:
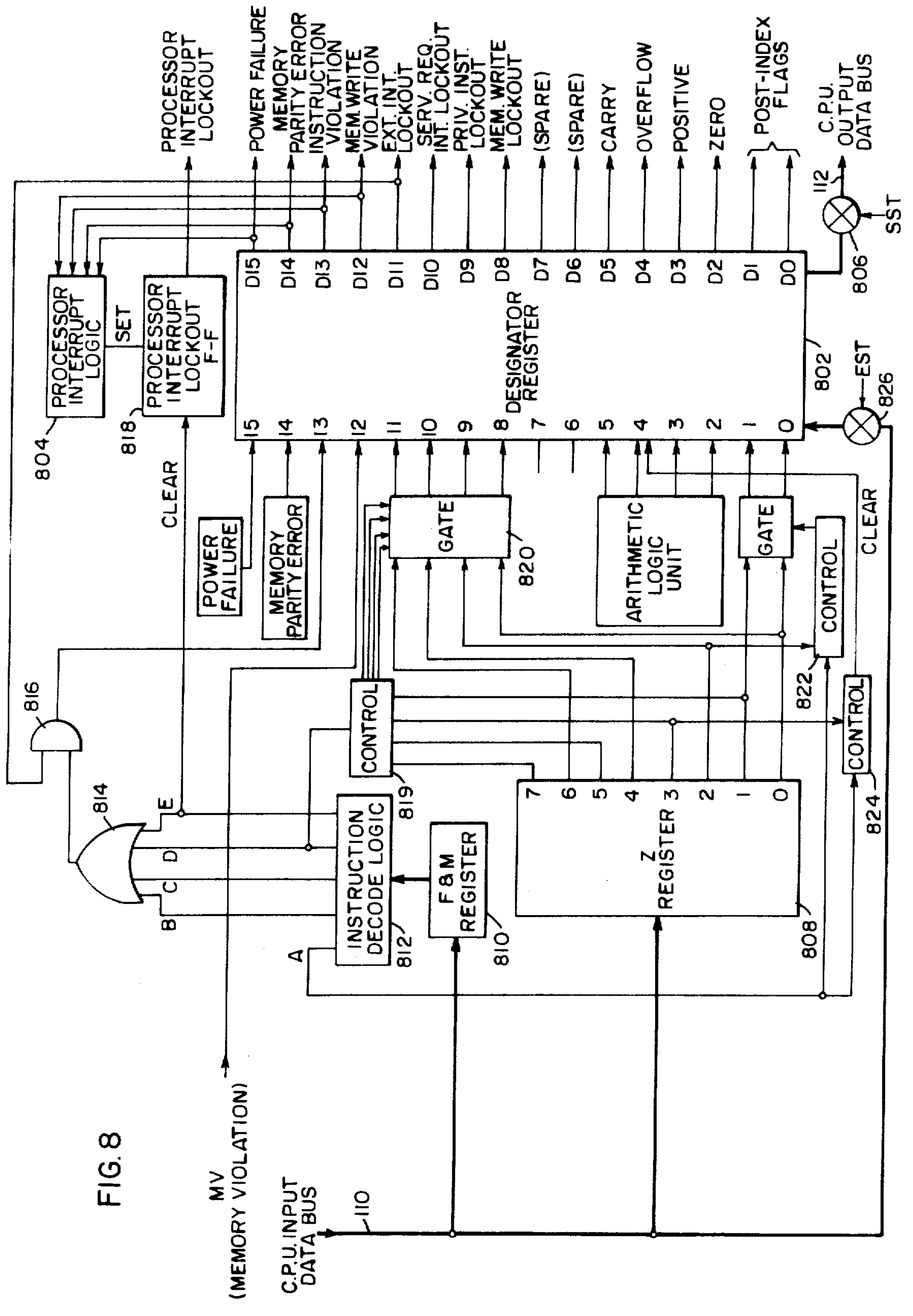
FIG. 8 is a simplified block diagram illustrating the details of certain elements within the central processing unit which appear as a block element in FIG. 1, including a designator register which contains most of the computer system flags.

If the central processing unit 102 actually attempts to alter memory data which resides in a protected region of the memory, then a gate 610 is fully enabled to generate an MV (memory violation) signal. The MV signal enables the gate 318 shown in FIG. 3 to transfer into the violation address register 320 the address of the memory location containing the data which the central processing unit 102 attempted to alter. With reference to FIG. 8, the MV (memory violation) signal is also fed into the twelfth stage of a designator register 802 within the central processing unit 102 where the MV signal sets a memory write violation flag. This memory write violation flag ultimately causes a processor interrupt logic 804 to generate what is called a processor interrupt. The processor interrupt then transfers program control back to the system executive in a manner which is explained more fully below.

The REST. (restore) signal is generated by the memory violation detection logic 314 in every case where there is a possibility that protected data within the system memory might be altered. The MV (memory violation signal) is only generated in those cases where control signals within the central processing unit 102 indicate definitely that an actual attempt to alter protected memory data is actually taking place.

The flip-flop 602 is set whenever the central processing unit 102 accesses the system core memory during protected system operations. The flip-flop 602 is set by an output signal that is generated by a NAND gate 612. The NAND gate 612 has seven inputs all of which must be high if the flip-flop 602 is to be set.

The upper two inputs to the NAND gate 612 prevent any memory violation protection action from taking place after the computer system 100 is initially placed into operation or is restarted and before suitable memory protection limits have been placed into the registers 302 and 304 (FIG. 3). When the computer system 100 is either restarted or is initially placed into operation, the system 100 is entirely reset by a pair of signals the first of which is called the SYSTM-ILK signal and the second of which is called the RESET signal. The SYSTM-ILK signal prepares the system for a complete reset, and then the RESET signal carries out the actual operation of resetting every element with the computer system. In FIG. 4, for example, the SYSTM-ILK signal prevents initiation of the operation of the timing stage 402 immediately prior to a resetting of the system, and then the RESET signal clears the timing stages 414, 416, and 418 and sets the timing stage 402. In a similar manner, these two signals reset a large number of flip-flops throughout the computer system, including all of the flip-flops within the memory violation detection logic 314 shown in FIG. 6.

The two flip-flops 614 and 616 are both cleared by the RESET signal when the system 100 is started or is restarted. They each generate a low level signal which disables the gate 612 and prevents any memory protect action from occurring following a system start or restart. When a data value is transferred into the upper limit register 302 (FIG. 3), the CU signal which causes the transfer sets the flip-flop 616 and causes the flip-flop 616 to supply a high level enabling signal to the gate 612. When a data value is transferred into the lower limit register 304, the CL signal which causes the transfer sets the flip-flop 614 to also supply a high level enabling signal to the gate 612. Hence, when both the signals CU and CL have been generated so that data has been loaded into both of the registers 302 and 304, the flip-flops 614 and 616 permit memory violation protection action to occur.

A third input to the NAND gate 612 comes from a NAND gate 618 which has as inputs the signal SEQ00 and the inverted signal EXTD.CDR. When the SEQ00 signal is present, it indicates that some operation is occurring over the extended system port bus 122 (FIG. 1), typically an operation carried out by the system operator using the operator console 124. Since it is desirable to give the console operator free access to any portion of the system memory at any time, the presence of the SEQ00 signal and the absence of the inverted EXTD.CDR signal enables the gate 618 to disable the gate 612 and to prevent any memory violation protect action from occurring during such operations.

Certain instructions within the instruction set for the computer system 100 may cause external hardware devices connected to the extended system port bus 122 to carry out operations within the computer system 100. For example, such an instruction might initiate the operation of an external floating point or multiple precision hardware arithmetic unit (not shown) that is connected to the extended system port bus 122. The instructions which cause such operations to be carried out are called "extended CDR" instructions, and an EXTD.CDR signal is present whenever such an instruction is carried out. It is desirable to have the memory protect subsystem functioning when such extended CDR instructions are executed, so the presence of the SEQ00 signal during the execution of extended CDR instructions has to be prevented from disabling the gate 612 at such times. For this reason, the inverted EXTD.CDR signal is used to disable the gate 618 from passing the SEQ00 signal to the gate 612 whenever an extended CDR instruction is carried out.

During interrupt operations, especially during a processor interrupt following an improper operation of the system, it is not desired to have the memory violation protect subsystem in operation. A signal NORM-M (normal mode) which is present during noninterrupt operations is fed into the gate 612 as an enabling signal. Whenever an interrupt operation occurs, the NORM-M signal is absent and its absence disables the gate 612.

Within the system 100, the memory violation protect feature is initiated by the setting of one or the other of two flags within a system 100 designator register 802 that is shown in FIG. 8. The two flags are the privileged instruction lockout flag which generates a signal D9 and a memory write lockout flag which generates an instruction D8. The output signals D8 and D9, in inverted form, are combined by an OR gate 620 and are fed in noninverted form into one input of the gate 612. Either one or the other of the signals D8 and D9 therefore must be present for the gate 612 to be fully enabled and for the memory violation protect subsystem to be operative.

On occasions, external devices have occasion to utilize or to "steal" a memory cycle from the central processing unit 102. It is not desired to have the memory violation protect subsystem active when such an event occurs. Hence, a START C.S. (start cycle steal) signal, in inverted form, is applied to one input of the gate 612 to disable the gate 612 whenever a memory cycle stealing operation takes place.

The last input signal to the gate 612 is the ST.M. (start memory) signal which is generated at the start of each memory access cycle. Assuming that the gate 612 is otherwise fully enabled, the ST.M. signal passes through the gate 612 and sets the flip-flop 602, thereby placing the memory protect feature into operation during the memory cycle which follows. At the end of the cycle, the flip-flops 602 and 606 are cleared by a T6 timing pulse, as is illustrated in FIG. 6.

The output of the flip-flop 602 partially enables a NAND gate 604. The NAND gate 604 is also partially enabled by the D.A. (data available) signal which is generated by the memory subsystem 104 when the subsystem has completed the first half of a memory cycle and has presented data to the input data lines 110.

The third input to the gate 604 is supplied with a signal only when the memory location which is addressed by the central processing unit 102 lies within a protected region of the system 100 memory. With reference to FIG. 3, it will be remembered that: if the addressed location lies above the unprotected region of the memory, a digital comparator 310 generates an $A > U$ signal; and if the address location lies below the unprotected region of the memory, a digital comparator 312 generates an $A < L$ signal. Either of these two signals may pass through a NOR gate 622 and may fully enable the NAND gate 604.

The D.A. (data available) pulse generated by the memory subsystem 104 is used to strobe the gate 604 at the half-way point of each memory cycle. If any protected memory location is addressed at a time when the flip-flop 602 is set, the D.A. pulse is enabled to pass through the gate 604 and to set the flip-flop 606. Both this pulse output of the gate 604 and the inverted output of the flip-flop 606 pass through an OR gate 608 and are applied to the REST. (restore) signal line shown in FIG. 2 so as to force the memory subsystem to write back into the memory whatever data was just retrieved from the memory subsystem.

The noninverted output of the flip-flop 606 partially enables the AND gate 61. In order to be fully enabled, the AND gate 610 must also sense that a PROT-REST signal is not being generated by the central processing unit and must also determine that the data which is to be transferred back into the system memory is nonidentical to the data which was just retrieved from the system memory.

The PROT-REST signal is a signal within the central processing unit 102 which corresponds to the REST signal and which is present whenever the Rest signal is generated by the central processing unit 102. The absence of the PROT-REST signal indicates that the central processing unit 102 has not requested that the data presented by the memory be restored to the memory location and therefore indicates that the central processing unit 102 is supplying replacement data to the output data bus 112 which data is to be stored within the memory location. The PROT-REST signal is applied in inverted form to an input of the gate 610 and partly eanbles the gate 610 by its absence, since its absence indicates an attempt to possibly change the contents of a memory location.

To determine whether the central processing unit is restoring the same data to the location or is supplying new data to the location, a digital comparator 316 (FIG. 3) is called upon to compare the data which is present on the central processing unit 102 input and output data busses 110 and 112 (see FIG. 3). The comparator 316 compares the 16 bits of data on each data bus and generates UHEQ (upper half equal) and LHEQ (lower half equal) signals if the same data is presented on both of the busses. If both the LHEQ and the UHEQ signals are generated, then the memory data presented by the memory subsystem 104 to the input data bus 110 is identical to the data which the central processing unit 102 is presenting to the memory subsystem over the output data bus 112, and the central processing unit is not attempting to alter the memory data. Since there is no attempt to alter memory data, when both the UHEQ and the LHEQ signal are both present, the signals together cause a NAND gate 624 to disable one input to the AND gate 610 and to prevent the generation of the MV (memory violation) signal.

To briefly summarize, if a protected area of the memory subsystem is addressed, then the flip-flop 606 partly enables the AND gate 610. If the central processing unit 102 has not instructed the memory to restore the data retrieved from the addressed location, then the absence of an inverted PROT-REST signal also partly enables the AND gate 610. If the central processing unit is not attempting to write back into the core memory the same data which was just retrieved from the core memory, then the gate 624 generates a high level signal which fully enables the AND gate 610.

An F.C. (finish cycle) pulse generated by the central processing unit 102 to complete each memory cycle is passed through a very brief time delay 626 similar to the time delay 504 shown in FIG. 5 and is then passed through the fully enabled AND gate 610 to become the MV (memory violation) signal. The MV signal then initiates a processor interrupt, as is described below.

A complete program and memory protection system includes, in addition to the memory violation protect subsystem which has now been fully described, modifications to the normal computer system 100 logic which cause certain of the instructions within the normal computer system instruction set to be executed in modified manners or not to be executed at all when program and memory protection is in effect. Before explaining exactly which instructions have their operations modified, it will be helpful to present background information on the nature of the instructions used within the system 100 and also on the nature of some of the hardware elements of the central processing unit 102 which participate in the detection of improper instructions when program and memory protection is in effect.

FIG. 7 illustrates the normal format of instructions used within the system 100. In general, each 16-bit instruction includes a 5-bit function portion which determines the nature or function of the instruction (addition, subtraction, transfer, etc.), a 3-bit mode portion which may modify the way in which instruction is executed or which may specify a particular mode of address computation, and an 8-bit displacement portion which typically defines the distance from a given reference address within the system memory to the address of a location typically containing an argument. For example, an instruction to add the contents of a given memory location to the contents of the system accumulator would contain a 5-bit code for addition in the function bit positions, mode bit pattern which might designate that a particular index register is to be used in computing an argument address, and a displacement portion which would indicate the relative address, with respect to the selected base register address, of a memory location containing the argument or value that is to be added into the system accumulator. Rather than identifying each instruction by its function code, three-letter mnemonics have been assigned to each instruction. Hence, while the function code for addition is "$01000_2$," the mnemonic code for addition is "ADD." In all of the discussions which follow, mnemonic codes will be used in the place of the actual function codes for given instructions.

With reference to FIG. 8, the central processing unit includes as designator register 802 within which a variety of system flags are stored. The flags D0 and D1 have to do with addressing and do not have relevance to the present invention. Similarly, the flags D2, D3, D4, and D5 indicate the nature of an arithmetic result and also are of no particular relevance to the invention. The flags D6 and D7 are unassigned at present.

The flags D8 through D11 are lockout flags whose function is to prevent the occurrence of various system operations at particular times. The system 100 includes hardware for handling normal external interrupts in response to contact closures and the like and also hardware for handling service request interrupts from external devices needing only the occasional execution of a single instruction within the system. These two types of interrupts may be respectively locked out by the setting of the respective flags D10 and D11 within the designator register.

The two flags D8 and D9 are relevant to the present invention. The flag D8 is a memory write lockout flag. When this flag is set, the memory protect features of the present invention are in effect, but any program may execute any instruction without producing a system interrupt. If the flag D9 is set, then the memory protect feature of the invention is in effect and also the instruction lockout provision within the central processing unit is in effect so as to give complete protection against any improper actions on the part of any programs. Output signals generated by the two flags D8 and D9 are fed into the memory violation detection logic 314 shown in FIG. 6 to initiate operation of the memory violation protect subsystem 136 as has been explained.

The remaining four flags within the designator register 802 are violation or improper operation flags one of which is set whenever a processor interrupt occurs within the computer system 100. Processor interrupts may be caused by a system power failure, by a memory parity error, by a memory protect violation, or by the execution of an improper instruction during a time when the full program and memory protect system is in operation. Each of the four flags D12, D13, D14, and D15 is dedicated to one of these four sources of processor interrupt.

The output signals D12, D13, D14, and D15 corresponding to the four flags are shown being fed into a processor interrupt logic 804. The logic 804, in response to such an input signal, waits until the end of the current machine cycle and then signals the central processing unit to execute a special out-of-sequence SST instruction that is stored in a specific memory location.

The out-of-sequence SST instruction causes the contents of the designator register 802 to be stored away and preserved in the system memory and also causes the flags in positions 9, 12, 13, 14, and 15 of the designator register 802 to be automatically cleared. The interrupt flags 10 and 11 are set by the SST instruction. The SST instruction also transfers program control to an appropriate executive routine which takes whatever steps are necessary to handle the violation or improper operation which has occurred. A processor interrupt lockout 818 is also set to prevent any further processor interrupt.

The data retrieval action of the SST instruction is indicated symbolically at 806 in FIG. 8, but the actual hardware which carries out this operation is far more complicated than that indicated at 806.

Whenever an instruction is executed within the computer system 100, the entire instruction is transferred from the central processing unit input data bus or from the fast access registers 118 (FIG. 1) into a Z data register 808 (FIG. 8). The function and mode code bits of the instruction are transferred into an F and M (function and mode) register 810 and are then interpreted by an instruction decode logic 812. All of this is shown in greatly simplified form in FIG. 8. If the instruction is one of those which may not be executed under the memory violation protect mode of operation, the instruction decode logic 812 generates one of four output signals B, C, D, or E all of which are fed into what amounts to an OR gate 14 and through what amounts to an AND gate 16 to set the instruction violation flag in the thirteenth flag position within the designator register 802. If the privileged instruction lockout flag in the ninth position of the designator register 802 is set, the D9 signal generated by this flag enables logic equivalent to the and gate 816 to pass the signal B, C, D, or E and to allow the signal to set the thirteenth instruction violation flag within the designator register 802. If the privileged instruction lockout flag is not set, then the gate 816 blocks the passage of the signal, and all instructions are executed in the normal manner.

Additional logic not shown in FIG. 8 prevents the effective operation of a privileged instruction when the privileged instruction lockout flag is set. An attempt to execute one of the privileged instructions produces no operation during the normal instruction cycle. Before another instruction cycle can begin, the processor interrupt logic 804 signals the termination of normal program execution and thus initiates a transfer of program control back to the system executive, as has already been explained.

The instructions whose execution is suppressed when the privileged instruction lockout flag within the designator register is set are instructions which could input or output data to or from the computer system, the halt instruction, instructions which may alter the lockout flags D8, D9, D10, and D11 within the designator register, and instructions which may clear the processor interrupt lockout flip-flop 818.

It is necessary to prevent the execution of input/output instructions when the program and memory protect system is operating for two reasons. First of all, normally all such instructions are supplied only by executive handler routines and are carefully scheduled so as to maximize system efficiency. It is desirable to force all programs to use the executive channels for carrying out input and output operations so as to obtain efficient use of the input/output channels. Secondly, data stored within the system mass storage could be destroyed by a program having unlimited access to the system input and output data channels. And finally, any program having the ability to generate input and output instructions may place new data values into the registers 302 and 304 within the memory violation protect subsystem and may thereby defeat the memory protection system. For these and other reasons, the instruction decode logic 812 generates the signal B in response to any attempt on the part of a program to execute an IOA data input or data output instruction when the privileged instruction lockout flag is set.

The memory protection system may also be defeated by a program which is able to clear the flags D8 and D9 within the designator register 802. These flags are set by a CDR (set designator register) instruction whose format is illustrated in the lower half of FIG. 7. When this instruction is executed, the displacement portion of the instruction is placed into the Z register 808 (FIG. 8). The instruction decode logic 812, in response to the combination of function code and mode code bits illustrated in FIG. 7, generates the signal D. This signal D normally allows a control 818 to accept data from the bit positions 1, 2, 5, and 7 with the Z register 808 and to pass this data on as control signals controlling the operation of a gate 820 connecting the bit positions 0, 2, 4, and 6 within the Z register 808 to the inputs 8, 9, 10, and 11 of the designator register 802. In this manner, the data in bit positions 1, 3, 5, and 7 of the displacement code determines whether or not the data in the adjacent bit positions 0, 2, 4, and 6 is transferred into the designator register or is ignored.

In the example presented in the lower half of FIG. 7, "1" data bits appear in bit positions 1 and 3 of the instruction, and hence, the data from bit positions 0 and 2 of the instruction are transferred through the gate 820 and are used to adjust the eighth and ninth flags within the designator register 802. Since the data in bit positions 0 and 2 are "1" data bits, the eighth and ninth designator register flags are set, thus initiating both the privileged instruction lockout and a memory write lockout mode of computer system operation. If "0" data bits are present in the zero and second bit positions within the instruction, then these two flags are cleared by the same instruction. In a similar manner, the external interrupt lockout and service request lockout flags in the tenth and eleventh bit positions within the designator register 802 may be set or cleared in accordance with the data in bit positions four and six of the instruction, but only when "1" data bits are present within the fifth and seventh bit positions of the instruction. Since execution of this instruction by a program could clear the memory write and privileged instruction lockout flags and grant the program unrestricted access to the system memory, the execution of this instruction is prevented during the privileged mode of operation. For this reason, the signal D is fed into the gate 814 as has been explained. It is to be understood that when the privileged mode of operation is in effect, means not shown in FIG. 8 are effective to defeat the action of the control 818 and to prevent the signal D from altering the flags within the designator register 802.

In the CDR instruction illustrated in FIG. 7, if the mode bit in the ninth bit position of the instruction were a "1" data bit, then the instruction decode logic 812 would generate a signal E which would clear the processor interrupt lockout flip-flop 818. The flip-flop 818 is normally set following the occurrence of a processor interrupt and is cleared when program control is returned to a nonprivileged program. As can be seen in FIG. 8, the presence of the signal E also initiates a processor interrupt during program execution by an unprivileged program.

The instruction decode logic 812 generates the signal C in response to an attempted execution of a system halt instruction. Since it is not desired to have an unprivileged program halt the processor, the signal C is fed into the gate 814 to initiate a processor interrupt.

When the CDR instruction is executed with combinations of bits in the mode bit positions other than those already discussed, instruction execution is allowed to be carried out. For example, if all of the mode bits in the CDR instruction are zero, then the instruction decode logic 812 generates a signal A which actuates control logic circuits 822 and 824. If a "1" data bit appears in the third bit position of such an instruction, the "1" data bit appears at the third bit position output of the Z register 808 and causes the control 824 to clear an arithmetic operation overflow flag within the designator register 802. If a "1" data bit appears in the second bit position of such an instruction, the "1" data bit appears at the second bit position output of the Z register 808 and causes the control 822 to transfer the data bits from bit positions 0 to 1 of the instruction into the correspondingly numbered flags within the designator register 802 to alter the addressing mode of the computer system 100. Execution of this CDR instruction is not inhibited during protect operations. When the most significant mode bit in the tenth bit position of a CDR instruction is a "1" data bit, the CDR instruction is an extended CDR instruction which is fed out to hardware connected to the extended system port 122 shown in FIG. 1. For example, such an instruction may be one which causes the operator console 124 to display data to the system operator. CDR instructions of this type also are executed even when the protect mode of operation is in effect. However, the execution of an extended CDR instruction which attempts to alter data stored in a protected region of the system memory is defeated by the program and memory protect system.

An EST instruction exists within the instruction set of the computer system 100 which may alter the entire contents of the designator register 802. This instruction is the normal instruction that is executed when program control is returned from a subroutine to a calling program. The EST instruction loads all of the computer system registers with data so as to restart the calling program right where program execution left off. During normal system operations, the EST instruction is able to alter all of the designator register flags 0 to 11. During protected modes of operation, the EST instruction is modified and only alters the flags numbered 0 to 7. It is therefore unable to clear the privileged instruction and memory write lockout flags, even though it may be used to set those flags. In FIG. 8, the EST instruction is shown symbolically controlling a gate 826 which connects the central processing unit input data bus 110 to the designator register 802. The gate 826 is a greatly simplified representation of the actual logic within the operating system 100 which carries out this transfer.

The normal instruction executed by an operating system to transfer program control from a main program to a subroutine is the instruction SST. The instruction SST is discussed above in the context of its out-of-sequence execution in response to a processor interrupt. This same instruction, when executed as a normal program instruction, causes the contents of the designator register 802 and of the other system registers to be stored away prior to the execution of a subroutine so that they may be later restored by means of the EST instruction when the main program is to be restarted at a later point in time. When the system 100 is operating normally outside of the protect mode, the SST instruction, whose operation is symbolically indicated by a gate 806 in FIG. 8, stores away all of the bits from the designator register 802. During the protect mode of operation, the SST instruction retrieves only bits 0 to 7 and 12 to 15 and does not retrieve the lockout bits 8, 9, 10, and 11 from the designator register 802.

The SST instruction may also be executed out-of-sequence in response to an external system interrupt. Just as in the case of a processor interrupt, an external interrupt causes program control to commence at a fixed core location with the execution of an out-of-sequence SST instruction. In response to such an external interrupt, the SST instruction stores away all of the system registers, sets the flags 9 and 10 within the designator register 802, and clears the ninth or privileged instruction lockout flag so as to allow the interrupt programs within the system to freely execute any instructions without causing a processor interrupt. With reference to FIG. 6, during either a processor interrupt or an external interrupt operation, the NORM-M (normal mode) signal shown in FIG. 6 is not present. Therefore all portions of the system memory may be freely accessed during either a processor or an external interrupt without any interference from the memory protect subsystem 136.

In a typical operating computer system, protected program execution may be initiated by the execution of an EST instruction which loads all of the system registers, including the designator register 802. Assuming that the system executive does not operate in a protected mode of operation, this EST instruction may set the two flags in the eighth and ninth positions of the designator register and may thereby put the protect mode of system operation into effect. The EST instruction may also load the system program counter with the address of the program which is to be executed. The program then runs its course, and is unable to use any of the privileged instructions or to alter any data in protected regions of the system memory. Data may be freely retrieved from any portion of the system memory, however, and hence the program has as much feedom as is possible compatible with a completely protected mode of system operation.

When the program has run to completion, the protect feature is released and the system executive is placed in operation simply by some action on the part of the program which is improper and which causes a processor interrupt. For example, the program could execute a halt instruction or attempt to carry out an input/output operation. Program control is then immediately transferred back to the executive by means of the processor interrupt procedure which has been explained. The processor interrupt lockout flip-flop 818 is set and the privileged instruction lockout flag in the ninth position of the designator register cleared by the operation of the SST instruction executed at the beginning of the processor interrupt. The system executive is then free to execute any instruction, including instructions which are privileged. The system executive is also free to access any portion of the system memory, since the fact that the processor interrupt lockout flip-flop 818 is set causes the NORM-M signal shown in FIG. 6 to be absent so as to defeat the operation of the memory protect subsystem 136.

After the executive program has carried out whatever operations need to be carried out, protected program execution may then be recommenced through the use of the EST instruction to reload the system registers with the data that the SST instruction stored away following the processor interrupt. Alternatively, the lockout flags may be set individually through the use of a CDR instruction which may simultaneously clear the processor interrupt lockout flip-flop 818.

The operation of both external and service request interrupts is unaffected by the protect feature of the invention. In response to an external interrupt, an out-of-sequence SST instruction is executed which sets the interrupt lockout flags 10 and 11 within the designator register 802 and which clears the privileged instruction lockout flag in the ninth position of the designator register 802 so as to allow the interrupt routines to execute any instructions without interference from the protect subsystem. The setting of the interrupt lockout flag also defeats the NORM-M signal shown in FIG. 6 and thus disables the memory protect subsystem so that the interrupt routines may have access to any portion of the system memory. The interrupt routines may return program control to the interrupted program with the protect system in operation simply by executing an EST instruction to reverse the data transfer carried out by the SST instruction following the interrupt. Service request interrupts, which are single instruction interrupts for transferring data between an external device and core, are executed in the normal manner regardless of the status of the lockout flags 8 and 9.

While the preferred embodiment of the invention has been described, it is to be understood that numerous modifications and changes will occur to those skilled in the art. It is intended to encompass all such modifications and changes as come within the true spirit and scope of the invention in the claims annexed to and forming a part of the specification.

What is claimed is:

1. A digital computer system comprising:

a central processing unit;

a memory subsystem containing data stored in individually addressable storage locations;

an address bus, at least one data bus, and control signal lines electrically connecting said central processing unit to said subsystem, said control signal lines including a restore signal line the presence of a signal upon which causes the memory subsystem to return to storage a data record identical to data which has just been retrieved and the absence of which signal causes the memory subsystem to return to storage new data presented by the data bus; and a removable memory protection accessory for said central processing unit comprising storage means within said memory protection subsystem for storing two address data items defining a range of addresses of storage locations within said memory subsystem containing data that is not to be altered - for example, data comprising supervisory or executive programs that are to be protected from accidental or intentional alteration by non-executive programs, an address bus input to said accessory, means for electrically connecting said address bus input to said address bus when said accessory is added to said central processing unit, a restore signal line output from said accessory, means for electrically connecting said restore signal line output to said restore signal line when said accessory is added to said central processing unit, comparison means connecting to said storage means and to said address bus input for comparing address bus data appearing at said address bus input to said two address data items to determine whether said address bus data represents an address falling within the range of addresses of storage locations containing data that is not to be altered, and means electrically connecting to said comparison means and to said restore signal line output for generating and applying to said restore signal line output a signal whenever the comparison means determines that an address presented at said address bus input is the address of protected data; whereby said accessory may prevent the alteration of certain data within the memory subsystem.

2. A system in accordance with claim 1 wherein said central processing unit includes a variety of interrupt modes of operation and wherein said memory protection accessory includes means for defeating the operation of the memory protection accessory in response to at least one signal from said central processing unit indicating that an interrupt mode of operation is in progress.

3. A system in accordance with claim 1 wherein the computer system includes an input and output data subsystem which is electrically interconnected to said central processing unit, and wherein said storage means within said memory protection accessory includes means which may receive data from the central processing unit over the normal data input and output channels of the computer system.

4. A system in accordance with claim 3 wherein the storage means includes means for storing a third address data item having a third address input, means for transferring data from said address bus input into said storage means by way of said third address input when an attempt is made to alter data in a protected address, and means which may transfer data from said storage means to said central processing unit using the normal data input and output channels of communication of the computer system.

5. A system in accordance with claim 1 wherein said central processing unit includes interrupt initiating means having an interrupt signal input line and means having an output signal line for generating and applying to said output signal line at least one signal indicative of an attempt by said central processing unit to alter data within said memory subsystem; and wherein said memory protection accessory includes at least one signal input line, means for electrically connecting said signal input line to said indicative output signal line when said accessory is added to said central processing unit, an interrupt signal output line, means for electrically interconnecting said interrupt signal output line to said interrupt signal input line when said accessory is added to said central processing unit, alteration detection means electrically connecting to said signal input line of said accessory for detecting when said central processing unit is attempting to alter data, and means electrically connecting to said interrupt signal output line for supplying a signal to said interrupt signal output line when said alteration detection means detects an attempt to alter data which said comparison means determines is protected data; whereby an attempt to alter protected data results in a computer system interrupt.

6. A computer system in accordance with claim 1 wherein said central processing unit includes at least one program-settable bistable device and means for supplying to said memory protection accessory a signal whose state indicates whether said bistable device is set or cleared, and wherein said accessory includes means for defeating the operation of said accessory at times when said signal is, in a particular one of its states whereby said bistable device controls the operation of said memory protection accessory.

7. A system in accordance with claim 6 wherein said central processing unit includes means placed into operation by the setting of said bistable device for modifying the execution of any instruction which normally could halt the computer system, reset the bistable device, alter the address data within said storage means, or cause some other action which could either defeat the operation of the memory protection accessory or disable the computer system.

8. A system in accordance with claim 7 wherein the central processing unit in addition includes means responsive to an attempt to execute a subset of the instructions having a modified mode of execution at a time when said bistable device is set for initiating an interrupt of normal computer system operations.

9. A system in accordance with claim 1 wherein the storage means comprises means for storing data, wherein the computer system includes means for transferring two address data items from said central processing unit into said data storage means, and wherein said comparison means comprises first comparator means having a signal output for comparing a first address data item to the address bus data, second comparator means having a signal output for comparing a second address data item to the address bus data and a gate having said two comparator means signals for inputs and having a single signal output.

10. A system in accordance with claim 9 which further includes means for preventing the operation of said memory protection accessory after the computer system is initially placed in operation until address data items have been placed into said data storage register.

* * * * *